(No Model.) 6 Sheets—Sheet 2.

J. W. FLOWER & R. J. COUSINS.
HOPPER FOR INTRODUCING DRY SUBSTANCES INTO CASKS, &c.

No. 582,415. Patented May 11, 1897.

(No Model.) 6 Sheets—Sheet 3.
J. W. FLOWER & R. J. COUSINS.
HOPPER FOR INTRODUCING DRY SUBSTANCES INTO CASKS, &c.

No. 582,415. Patented May 11, 1897.

(No Model.) 6 Sheets—Sheet 4.

J. W. FLOWER & R. J. COUSINS.
HOPPER FOR INTRODUCING DRY SUBSTANCES INTO CASKS, &c.

No. 582,415. Patented May 11, 1897.

Witnesses. Inventors.

(No Model.) 6 Sheets—Sheet 5.
J. W. FLOWER & R. J. COUSINS.
HOPPER FOR INTRODUCING DRY SUBSTANCES INTO CASKS, &c.

No. 582,415. Patented May 11, 1897.

Witnesses. Inventors.

(No Model.) 6 Sheets—Sheet 6.

J. W. FLOWER & R. J. COUSINS.
HOPPER FOR INTRODUCING DRY SUBSTANCES INTO CASKS, &c.

No. 582,415. Patented May 11, 1897.

Witnesses. Inventors.
J. D. Kingsbury. John Walter Flower & Robert John Cousins
G. A. Rauberschmitt. By Whitaker & Prevost attys.

UNITED STATES PATENT OFFICE.

JOHN WALTER FLOWER AND ROBERT JOHN COUSINS, OF SHAFTESBURY, ENGLAND.

HOPPER FOR INTRODUCING DRY SUBSTANCES INTO CASKS, &c.

SPECIFICATION forming part of Letters Patent No. 582,415, dated May 11, 1897.

Application filed October 12, 1896. Serial No. 608,607. (No model.) Patented in England October 22, 1890, No. 16,864, and in Germany April 28, 1891, No. 59,728.

*To all whom it may concern:*

Be it known that we, JOHN WALTER FLOWER and ROBERT JOHN COUSINS, subjects of the Queen of Great Britain, residing at Shaftesbury, England, have invented new and useful Improvements in Hoppers for Introducing Dry Substances into Casks or other Vessels, (for which we have obtained Letters Patent in Great Britain, No. 16,864, dated October 22, 1890, and in Germany, No. 59,728, dated April 28, 1891,) of which the following is a specification.

This invention relates to improvements in apparatus for filling casks, barrels, and other vessels with hops or any other similar substance.

According to our invention we provide a frame in which we mount a funnel adapted to be rotated by suitable gearing attached to the said frame, and we also provide a number of filling-plungers connected to cranks operated by the said gearing in such a manner that the said filling-plungers have imparted to them an up-and-down reciprocatory motion. We also provide a suitable stand or support for the frame.

Figure 1:
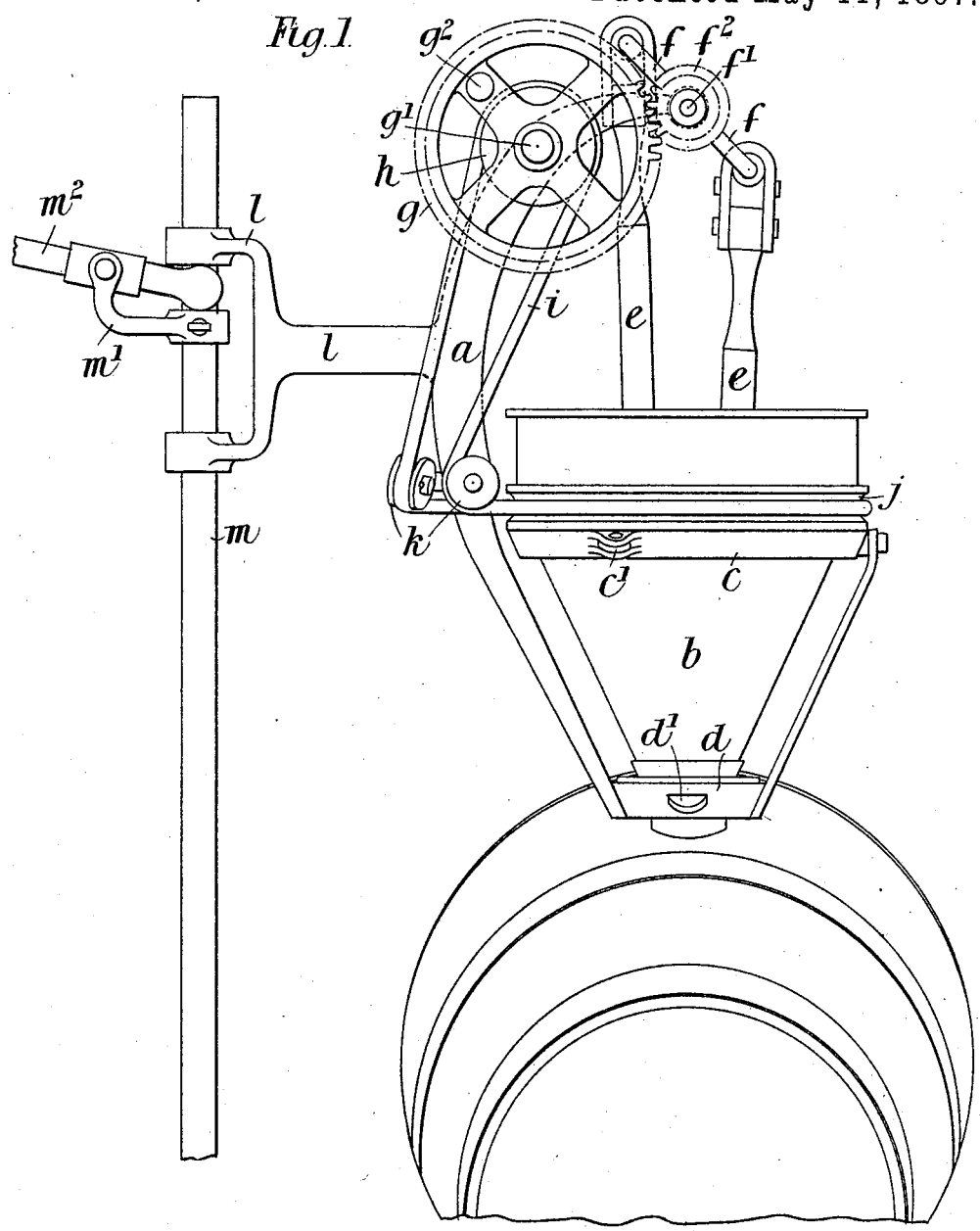
Figure 2:
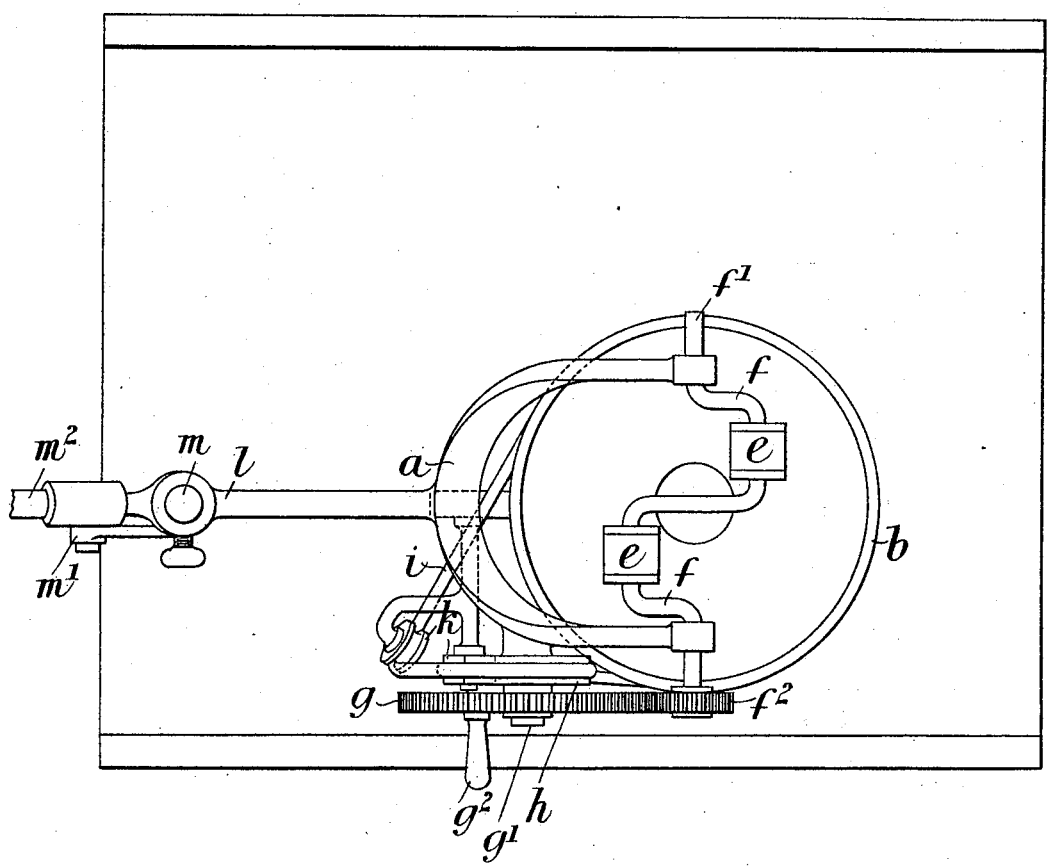
Figure 3:
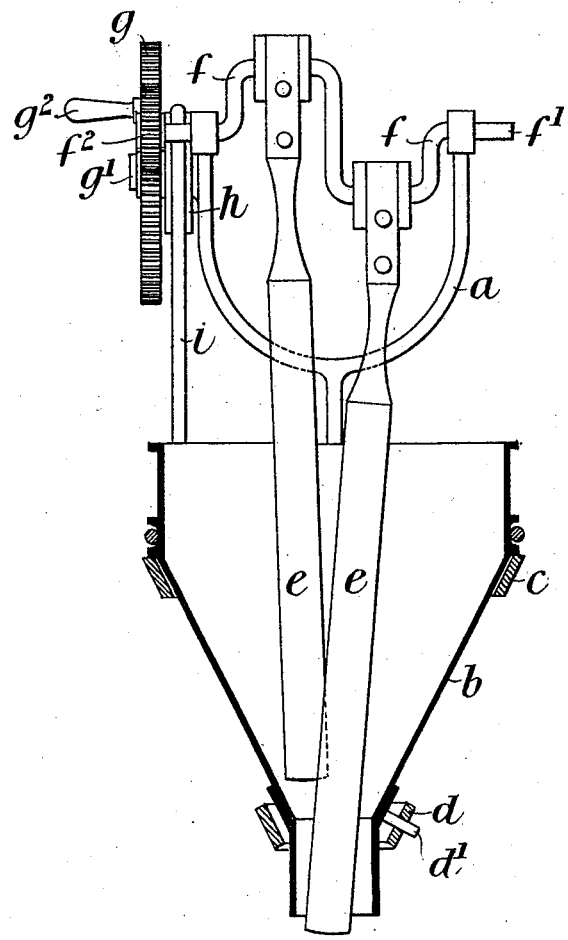
Figure 4:
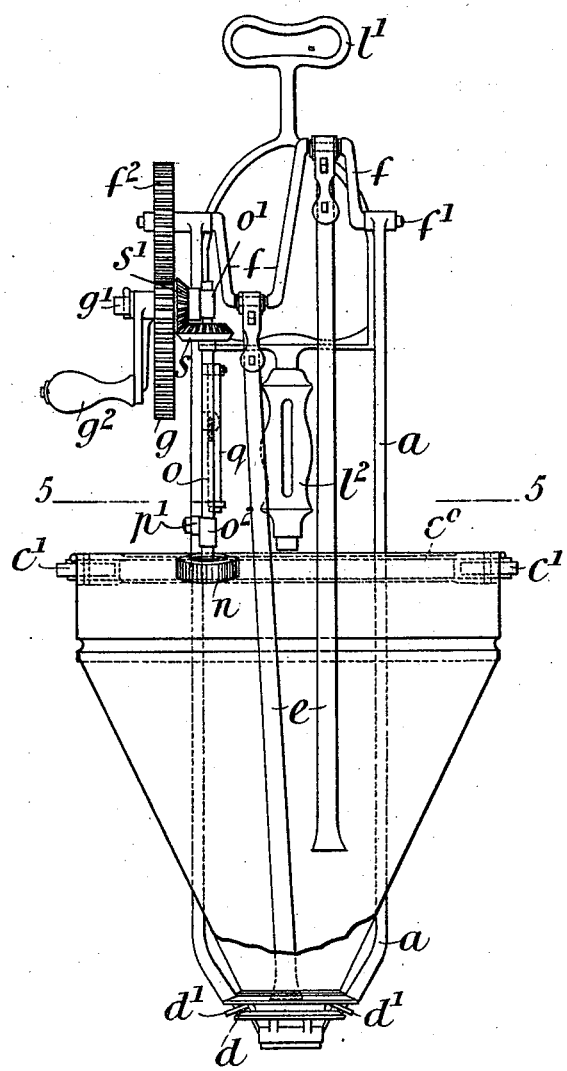
Figure 5:
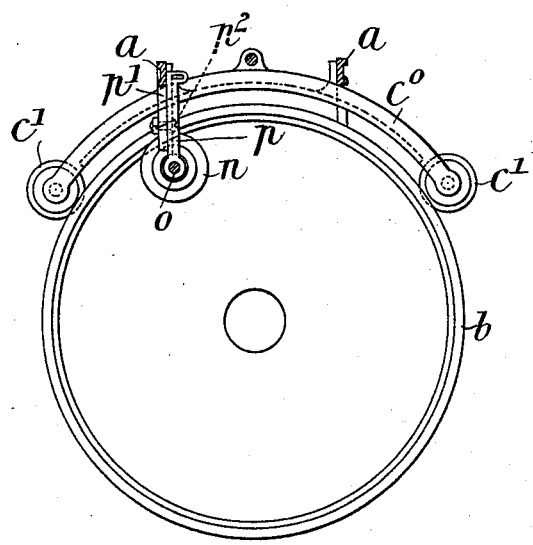
Figure 6:
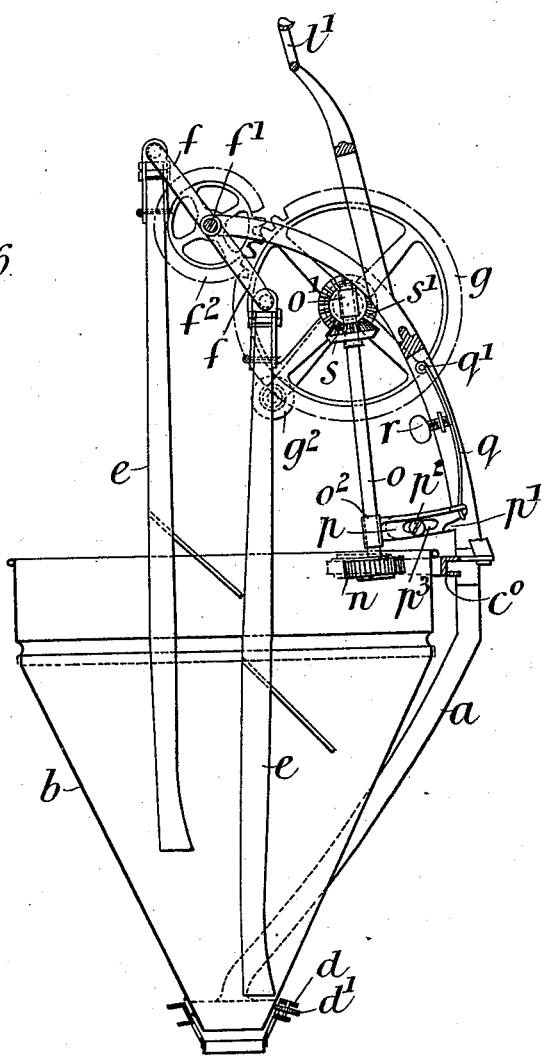

In the accompanying drawings, Figure 1 is an elevation of an apparatus constructed according to our invention. Fig. 2 is a plan of the same. Fig. 3 is a vertical section of the apparatus. Fig. 4 is an elevation of a modified form of our apparatus, the funnel being partly in section. Fig. 5 is a section on the line 5 5, Fig. 4; and Fig. 6 is a vertical section of the same.

Referring to Figs. 1, 2, and 3, $a$ is the frame of the apparatus and $b$ the funnel, the said funnel being supported in rings $c$ and $d$, forming part of the frame $a$. The rings $c$ and $d$ are provided with friction-rollers $c'$ $d'$, respectively, to reduce the friction when the funnel is rotating.

$e\,e$ are the filling-plungers, (two in number,) the said plungers being mounted at their upper ends on cranks $f\,f$ on a crank-shaft $f'$, rotatably mounted in the upper end of the frame $a$, which is forked to support the two ends of the crank-shaft $f'$, as shown clearly in Figs. 2 and 3.

$g$ is a spur-wheel mounted on a spindle $g'$, supported in the frame $a$ of the machine and having a handle $g^2$, by means of which it can be rotated by hand. A pulley $h$ is attached to the wheel $g$, and a band or belt $i$ passes over this pulley and around a groove $j$ in the upper part of the funnel $b$, pulleys $k\,k$ being provided to suitably guide the said band $i$. The spur-wheel $g$ also engages with a pinion $f^2$ on the crank-shaft $f'$, so that by turning the handle $g^2$ of the wheel $g$ the funnel $b$ is rotated and the filling-plungers $e\,e$ are reciprocated up and down simultaneously, so as to feed the hops or the like in the funnel through the outlet at the bottom of the same into the barrel or cask or the like into which the said outlet end of the funnel is inserted, as shown clearly in Fig. 1.

The frame $a$ is provided with a bracket $l$, adapted to slide on a fixed support $m$. The said support $m$ is provided with a bracket $m'$, to which a lever $m^2$ is pivoted, upon the inner end of which lever $m^2$ the bracket $l$ rests, so that when the outer end of the said lever $m^2$ is depressed the said bracket and frame $a$ of the machine are raised and the funnel is removed from the cask or barrel to allow the latter to be taken away and another to be put in its place. The bracket $m'$ can be fixed in any position on the fixed support $m$, so that the funnel can be arranged at any height to suit barrels and casks of different sizes.

In the form of our apparatus shown in Figs. 4, 5, and 6 the frame $a$, instead of being provided with a bracket $l$, designed to be held in a support $m$, is furnished with handles $l'\,l^2$, so that the machine can be held in position on the barrel or cask by hand. The upper ring $c$ is replaced by an arm $c^0$, carrying friction-rollers $c'\,c'$.

The driving-gear comprises, as in the previous case, a spur-wheel $g$, handle $g^2$, and pinion $f^2$ on the crank-shaft $f'$. The pulley $h$ and belt $i$ are, however, dispensed with, the funnel being in this case driven by the friction-wheel $n$, which presses against the inner surface of the funnel $b$ and is carried by a spindle $o$, mounted in bearings $o'\,o^2$. The upper bearing $o'$ is pivotally attached to the frame $a$ of the machine, and the lower one $o^2$ is rigidly attached to a sliding piece $p$, connected to a lug $p'$ of the frame $a$ by a screw $p^2$, which passes through a slot $p^3$ in the sliding piece $p$, so as to allow the latter to move relatively with the frame $a$.

$q$ is a spring connected at its upper end to the frame $a$ at $q'$ and at its lower end to the sliding piece $p$, so as to press the roller $n$ against the funnel $b$.

$r$ is a screw for regulating the pressure of the spring on the sliding piece $p$. The upper end of the spindle $o$ is provided with a bevel-wheel $s$, which gears with a second bevel-wheel $s'$, connected to the spur-wheel $g$, so that the spindle $o$ and friction-roller $n$ are rotated by the handle $g^2$ simultaneously with the up-and-down movement of the filling-plungers $e\ e$.

Having now particularly described and ascertained the nature of our said invention and in what manner the same is to be performed, we declare that what we claim is—

1. In hoppers for introducing dry substances into casks and other vessels the combination of a frame, a rotary funnel, filling-plungers and means for simultaneously rotating the funnel and reciprocating the filling-plungers, substantially as described.

2. In hoppers for introducing dry substances into casks and other vessels the combination of a frame, a support for the frame, a rotary funnel, filling-plungers and means for simultaneously rotating the funnel and reciprocating the filling-plungers, substantially as described.

3. In hoppers for introducing dry substances into casks and other vessels the combination of a frame, a support for the frame, a lever pivoted to the said support and designed to lift the frame, a rotary funnel supported in the frame, filling-plungers, cranks for operating the same, and means for simultaneously rotating the funnel and cranks, substantially as described.

4. In hoppers for introducing dry substances into casks and other vessels the combination of a frame, a rotary funnel supported in the said frame, filling-plungers, cranks for operating the same, a friction-roller mounted on a spindle, means for holding the friction-roller in contact with the funnel, and gearing for simultaneously rotating the cranks and spindle, substantially as described.

5. The combination with a hopper for introducing dry substances into casks and other vessels and having a frame carrying a rotatable funnel of friction-rollers mounted in the said frame and against which the funnel rotates, substantially as described.

In testimony whereof we, the said JOHN WALTER FLOWER and ROBERT JOHN COUSINS, have hereunto subscribed our names this 22d day of September, 1896.

JOHN WALTER FLOWER.
ROBERT JOHN COUSINS.

Witnesses:
C. G. REDFERN,
JOHN E. BOUSFIELD.